United States Patent [19]
Ishida

[11] Patent Number: 5,900,447
[45] Date of Patent: May 4, 1999

[54] COMPOSITION FOR FORMING HIGH THERMAL CONDUCTIVITY POLYBENZOXAZINE-BASED MATERIAL AND METHOD

[75] Inventor: Hatsuo Ishida, Shaker Heights, Ohio

[73] Assignee: Edison Polymer Innovation Corporation, Akron, Ohio

[21] Appl. No.: 08/846,457

[22] Filed: May 1, 1997

[51] Int. Cl.$^6$ ...................................................... C08K 3/38
[52] U.S. Cl. .......................... 524/404; 524/401; 524/430; 524/493
[58] Field of Search ..................................... 524/404, 401, 524/430, 493

[56] References Cited

U.S. PATENT DOCUMENTS

| 5,021,484 | 6/1991 | Schreiber et al. | 524/405 |
| 5,139,885 | 8/1992 | Nakane et al. | 524/94 |
| 5,152,939 | 10/1992 | Ishida | 528/153 |

*Primary Examiner*—Tae Yoon
*Attorney, Agent, or Firm*—Eugene Lieberstein; Michael N. Meller

[57] ABSTRACT

The present invention relates to a composition and method for forming a high thermal conductivity polybenzoxazine-based material. The composition comprises at least one benzoxazine resin and a filler material which includes particles of boron nitride in an amount sufficient to establish a thermal conductivity of between about 3 W/mK and 37 W/mK in the polybenzoxazine-based material.

16 Claims, 3 Drawing Sheets

COMPOSITION FOR FORMING HIGH THERMAL CONDUCTIVITY POLYBENZOXAZINE-BASED MATERIAL AND METHOD

FIELD OF THE INVENTION

The present invention relates to a composition for forming a high thermal conductivity polybenzoxazine-based material containing boron nitride and method.

BACKGROUND OF INVENTION

Molding compositions are useful in the electronics industry to encapsulate electrical components so as to protect them from electrical and environmental damage. However if the thermal conductivity of the composition is too low the encapsulant may itself be detrimental in that it may act as a heat barrier and cause the temperature of the electrical components to rise above the temperature reliability specifications for the components. This will shorten the useful life of the encapsulated electrical components particularly for components such as semiconductors. The heat dissipation problem in microelectronics is becoming increasingly important as the demands for denser and faster circuits intensify. Polymer compounds with high thermal conductivity are also useful for other products such as computer cases, battery cases, electronic controller housings and for other encasements where heat removal is an important consideration.

Conventional molding compositions include epoxy based polymers filled with fused or crystalline silica. Silica is the predominant filler presently used in thermal molding compounds due to its low cost, low thermal expansion, and low electrical conductivity. However, both types of silica are poor thermal conductors independent of the polymer in which the silica is filled. Other filler materials have also been investigated including ceramic fillers such as aluminum oxide, aluminum nitride and boron nitride. To date the maximum thermal conductivity for commercially available materials remains substantially below about 5 W/mK independent of filler material and/or epoxy resin formulation. In fact most commercially available molding compounds presently used in plastic microelectronic packaging typically have thermal conductivity values around 0.7 W/mK. Higher thermal conductivities have been reported in the literature such as for example in the 1988 IEEE by Bujard entitled Thermal Conductivity of Boron Nitride filled Epoxy Resins: Temperature Dependence and Influence of Sample Preparation in which a formulation of alumina loaded bisphenol-F epoxy resin is reported having a thermal conductivity of up to 4.5 W/mK.

Boron nitride is a known substitute for fused silica ($SiO_2$) to provide low thermal expansion and high electrical resistivity. Boron nitride as well as aluminum nitride and aluminum oxide should theoretically provide a thermal conductivity higher than fused silica at high loading concentrations. However, to date the highest loading attainable for a boron nitride filler in an epoxy resin has been between about 65 to 75 wt. % and then only when additives and/or modifiers are included to improve the flow characteristics of the compound. Additives and modifiers increase cost and may affect other properties such as strength. In this regard boron nitride epoxy formulations have been reported with thermal conductivities in the range of 5 W/mK and up to 13 W/mK using additives to increase the ease of processing.

SUMMARY OF THE INVENTION

It has been discovered in accordance with the present invention that thermal conductivities well above 5 W/mK and up to 37.5 W/mK or higher may be attained with a polymer-based material of polybenzoxazine filled with particles of boron nitride. Surprisingly such high levels of thermal conductivity were attainable in accordance with the present invention only when a benzoxazine resin was filled at least partially with boron nitride i.e., the filler need not be exclusively boron nitride and may include another filler materials such as silica, aluminum oxide or aluminum nitride to minimize cost and/or to tailor the composite to a desired thermal conductivity. However, if aluminum oxide, aluminum nitride or silica is substituted entirely for boron nitride the thermal conductivity of the polybenzoxazine composite remains very low even at high loading capacity levels of over 80 volume %. However, the benzoxazine resin may include more than one type of benzoxazine monomer and may also include co-reactants inclusive of comonomers, additives or mixtures thereof.

Accordingly, a polymer composition has been discovered in accordance with the present invention for use in forming a high thermal conductivity polybenzoxazine based material comprising at least one benzoxazine resin and a filler material which includes particles of boron nitride with the filler material loaded to a minimum concentration level of at least about 60 wt. %. The concentration of boron nitride in the filler material may be tailored to provide a desired thermal conductivity extending from above about 3 W/mK to 37 W/mK. The preferred composition to yield maximum thermal conductivity consists essentially of at least one benzoxazine resin and particles of boron nitride.

A method has further been discovered in accordance with the present invention for use in forming a high thermal conductivity polybenzoxazine-based material comprising the steps of combining a filler material which includes particles of boron nitride with at least one benzoxazine resin to form a composition in which the filler material is loaded at a minimum concentration level of at least about 60 wt. % and curing the composition. The composition is preferably processed by molding under elevated pressure and/or temperature.

BRIEF DESCRIPTION OF THE DRAWINGS

The advantages of the present invention will become apparent from the following detailed description of the present invention when read in conjunction with the accompanying drawings of which.

DETAILED DESCRIPTION OF THE INVENTION

Figure 1:
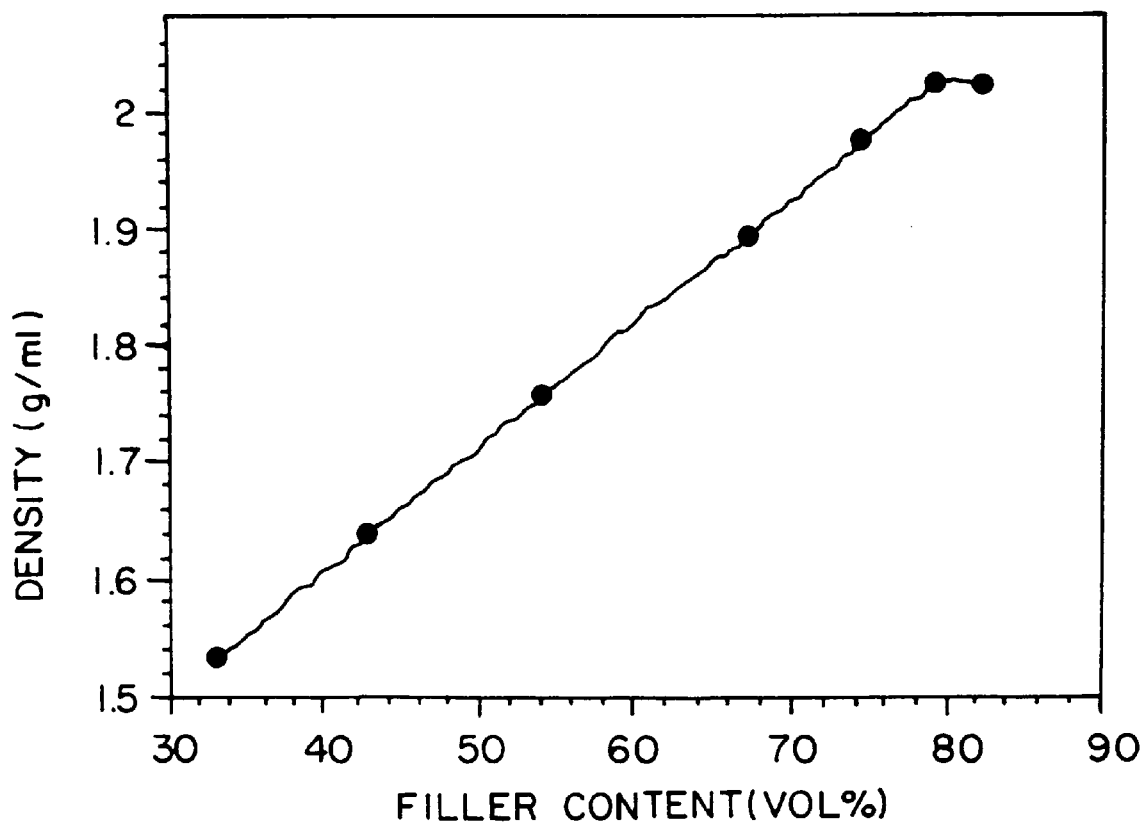
FIG. 1 is a graph showing the density vs filler content relationship for a boron nitride-filled polybenzoxazine composite in accordance with the present invention.

The compound of the present invention consists of a polybenzoxazine based polymer and a filler comprising particles of boron nitride. Polybenzoxazine is a phenolic-like thermosetting resin including mutifunctional heretocyclic compounds in which the multi-functional benzoxazine groups are preferably prepared by the condensation of a multi-functional phenol, formaldehyde, and a primary amine. Reaction occurs by ring-opening polymerization of the aromatic oxazines. The polybenzoxazine of the present invention may utilize bisphenol-A, methylamine, and formaldehyde to form a monomer precursor having the following chemical structure hereinafter designated "B-m":

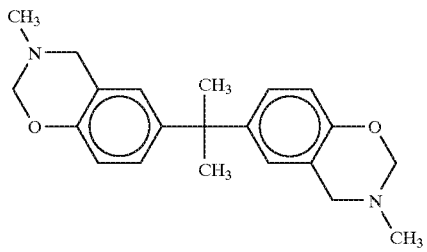

B-m monomer

A similar benzoxazine monomer precursor structure which utilizes bisphenol-F instead of bisphenol-A is shown below designated "B-f":

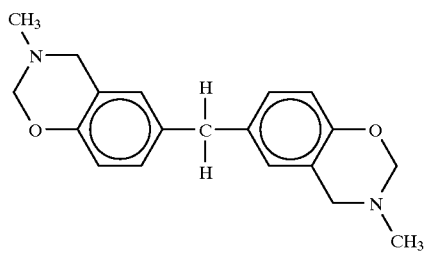

B-f monomer

Another difunctional benzoxazine monomer can be formed using aniline and bisphenol-A to form the following precursor structure hereinafter designated "B-a":

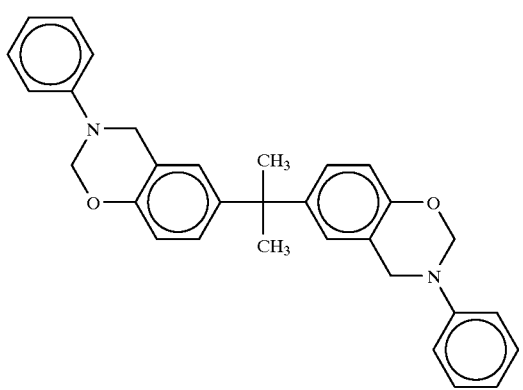

B-a monomer

Another similar benzoxazine monomer precursor structure which utilizes bisphenol-F and aniline is shown below designated "B-af":

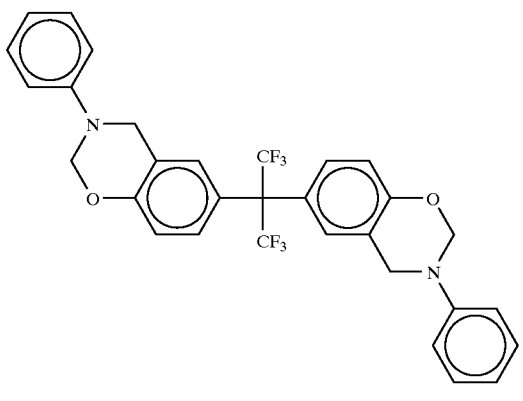

B-af monomer

These compounds can be represented by the following formulas:

Class 1

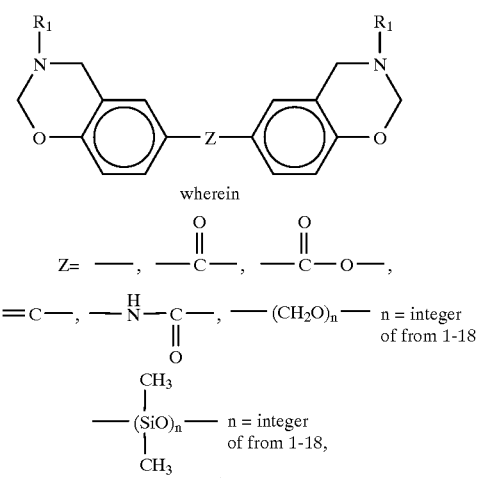

or an unsubstituted or substituted amino group

Class 2

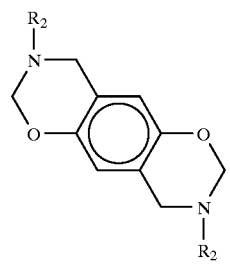

wherein

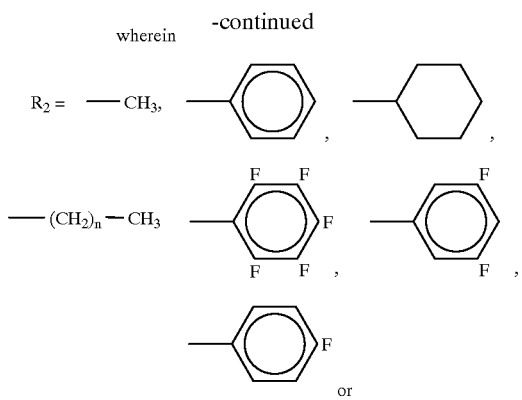

an unsubstituted or substituted amine, wherein n is an integer of FIGS. 1 to 18

Class 3

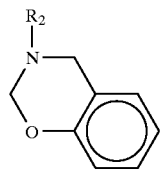

wherein $R_2$ is as defined above, and the benzene rings are unsubstituted or are substituted by one or more groups selected from —$CH_3$, —Br, etc.

Class 4

Multifunctional benzoxazine monomers of the formulas

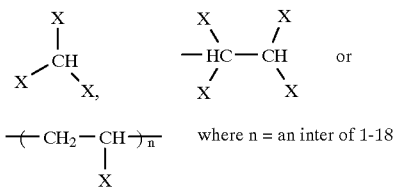

and x is

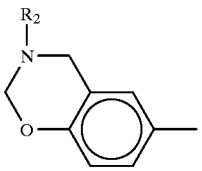

Class 5

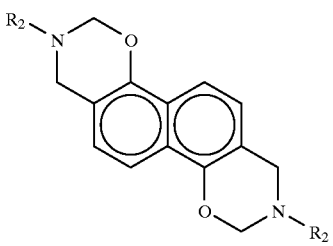

wherein $R_2$ is as defined for class 2 and wherein the positions of the —OH in the initial phenol are varied The physical and mechanical properties of the benzoxazine monomer types "Ba" and "Bm" are taught and described in the Journal of Polymer Science Vol. 34, 1019–1030 (1996) by Hatsuo Isida, the inventor of the subject patent application and Douglas J, Allen. A more detailed explanation of polybenzoxazine and its monomer preparation is disclosed in Polymer Composites October 1996 Vol 17, No. 5 by Shayn Shen and Hatsuo Ishida.

It has been discovered in accordance with the present invention that in a composition containing a benzoxazine resin and a filler material which includes particles of boron nitride, the benzoxazine resin permits the boron nitride to be loaded to concentration levels well above 60 wt. % and up to 90 wt. %. Upon the application of pressure and/or heat a polybenzoxazine-based material is formed having an elevated thermal conductivity dependent upon the boron nitride concentration. Thermal conductivities as high as 37 W/mK can be attained. This is confirmed by the data in Tables 1 and 11 as follows:

TABLE 1

Thermal Conductivity For Type Bm Polybenzoxazine Compounds Filled with Boron Nitride

| Sample Number | Filler Weight % | Filler Volume % | Polymer Weight % | Thermal Conductivity W/mK |
| --- | --- | --- | --- | --- |
| 1 | 50 | 31 | 60 | 1.7 |
| 2 | 70 | 56 | 30 | 9.9 |
| 3 | 80 | 68 | 20 | 20.3 |
| 4 | 90 | 83 | 10 | 33.7 |
| 5 | 90 | 83 | 10 | 37.5 |

TABLE 11

Thermal Conductivity For Typical Polybenzoxazine Compounds Filled with Boron Nitride

| Sample Number | Polybenzoxazine Type | BN Filler Weight % | BN Filler Volume % | Thermal Conductivity W/mK |
| --- | --- | --- | --- | --- |
| 9 | Ba | 85 | 75 | 19.8 |
| 10 | BaF | 85 | 75 | 10.6 |
| 11 | BF | 85 | 75 | 20.9 |

In sharp contrast the following table 111 shows the thermal polybenzoxazine composite loaded with conventional typical her than boron nitride:

TABLE 111

Thermal Conductivity For Type Bm Polybenzoxazine Compounds Loaded With Typical Fillers

| Sample Number | Filler Type | Filler Weight % | Polymer Weight % | Filler Volume % | Thermal Conductivity W/mK |
| --- | --- | --- | --- | --- | --- |
| 6 | Silica | 89.9 | 10.1 | 83 | 0.7 |
| 7 | Aluminum Nitride | 93 | 7.0 | 83 | 7.4 |
| 8 | Aluminum Oxide | 94.1 | 5.9 | 83 | 3.4 |

The thermal conductivity of the type Bm polybenzoxazine compounds filled with boron nitride at various loading levels is shown in Table 1 whereas in Table 11 the thermal conductivity of other type of polybenzoxazine compounds filled with boron nitride is shown. From both of these tables it is clear that very high thermal conductivity is attainable independent of the benzoxazine precursor. It is also evident that a mixture of different type benzoxazine precursors may be used and that coreactants and/or additives may likewise be included in the polymer based composition in combination with the filler material containing particles of boron nitride such that the thermal conductivity of the polybenzoxazine material may be tailored up to a thermal conductivity of 37 W/mK as well as to maximize its physical properties inclusive of strength and viscosity. Suitable coreactants may include epoxies, phenolics or amines. The coreactant may act as a reactive diluent to reduce viscosity and/or change network structure. Benzoxazine-epoxy copolymerization is taught in the Journal of Polymer Science Vol. 37 Number 20 1966 pp. 4487–4499 entitled "Mechanical characterization of copolymers based on benzoxazine and epoxy" by Hatsuo Ishida, the inventor of the subject patent application and Douglas J, Allen the disclosure of which is herein incorporated by reference. Other additives may also be included such as lubricants and non-polymerizable diluents.

The test data in Tables 1 and 11 confirm that one or more type benzoxazines may be utilized in combination with boron nitride to achieve high thermal conductivity polybenzoxazine-based material in accordance with the present invention with the level of thermal conductivity dependent upon the percent loading of boron nitride. The boron nitride used was conventional grade hexagonal boron nitride in a particulate form having particles that can vary in size from as low as submicron to millimeter size although the preferred average size extends from 10 to 700 microns with a more preferred range between 20–300 microns. A loading of boron nitride to a concentration above 50 wt. % is necessary if thermal conductivities above about 5 W/mK are to be attainable. The benzoxazine of the bisphenol-A-methylamine type is preferred and may be synthesized as taught in the above noted publication in the Journal of Polymer Science Vol. 34, 1019–1030 (1996) by Hatsuo Ishida.

Figure 2:
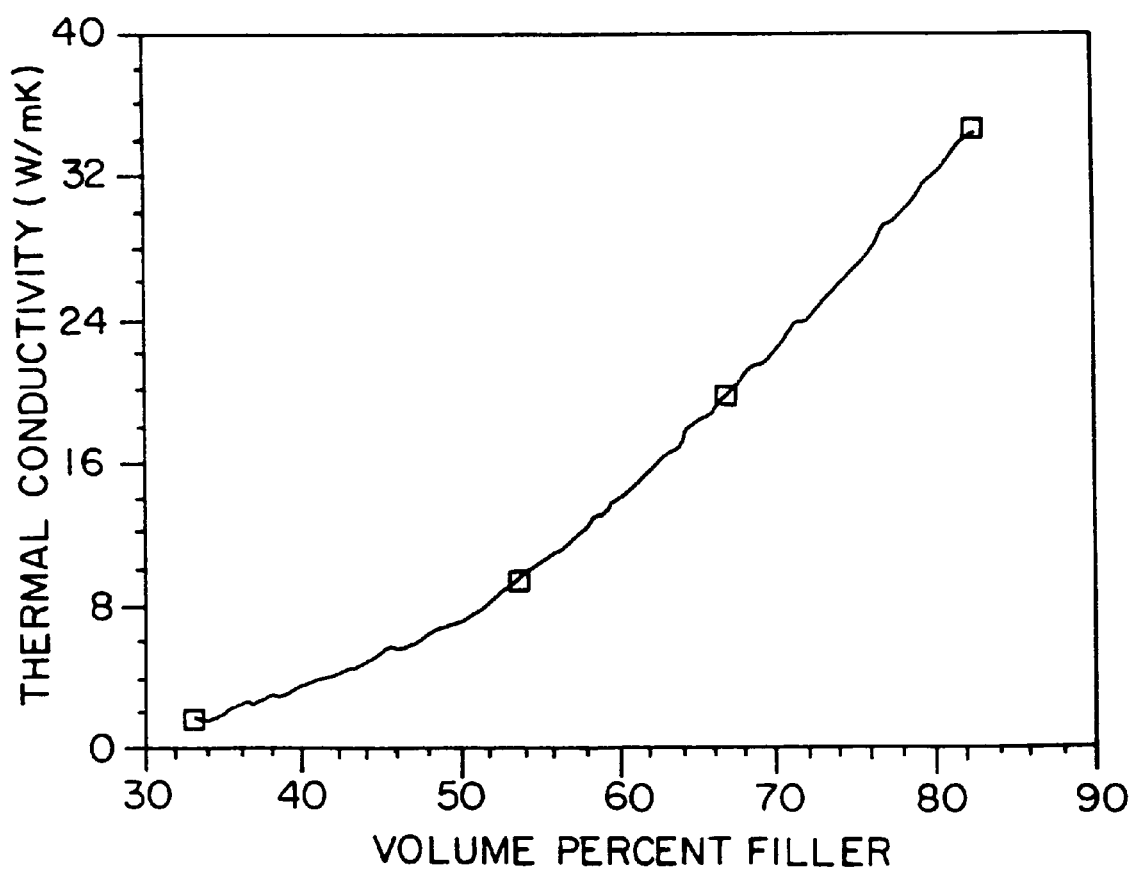
FIG. 2 is a graph showing the relationship of thermal conductivity to the volume percent of boron nitride filler in a polybenzoxazine polymer composite in accordance with the present invention.

FIG. 1 shows the relationship between the density of the boron nitride-filled polybenzoxazine composite as a function of filler content. This confirms that a linear relationship exists between increasing composite density for the boron nitride-filled polybenzoxazine and filler content up to a loading of about 90 volume %. Hence a synergism exists using a benzoxazine precursor and boron nitride which permits very high boron nitride loadings to achieve very high thermal conductivities. FIGS. 1 and 2 readily confirm that one can tailor the composition using any filler composition containing particles of boron nitride to achieve a given thermal conductivity since the thermal conductivity is primarily dependent upon filler loading and is almost in a linear relationship to volume percent filler between 55 and 80 volume % as shown in FIG. 2. Accordingly, the boron nitride filler may be combined with any other ceramic filler(s) to optimize cost and/or to maximize other physical characteristics as long as a minimum concentration of boron nitride is present to satisfy a minimum requirement for high thermal conductivity at above about 5 W/mK.

Figure 3:
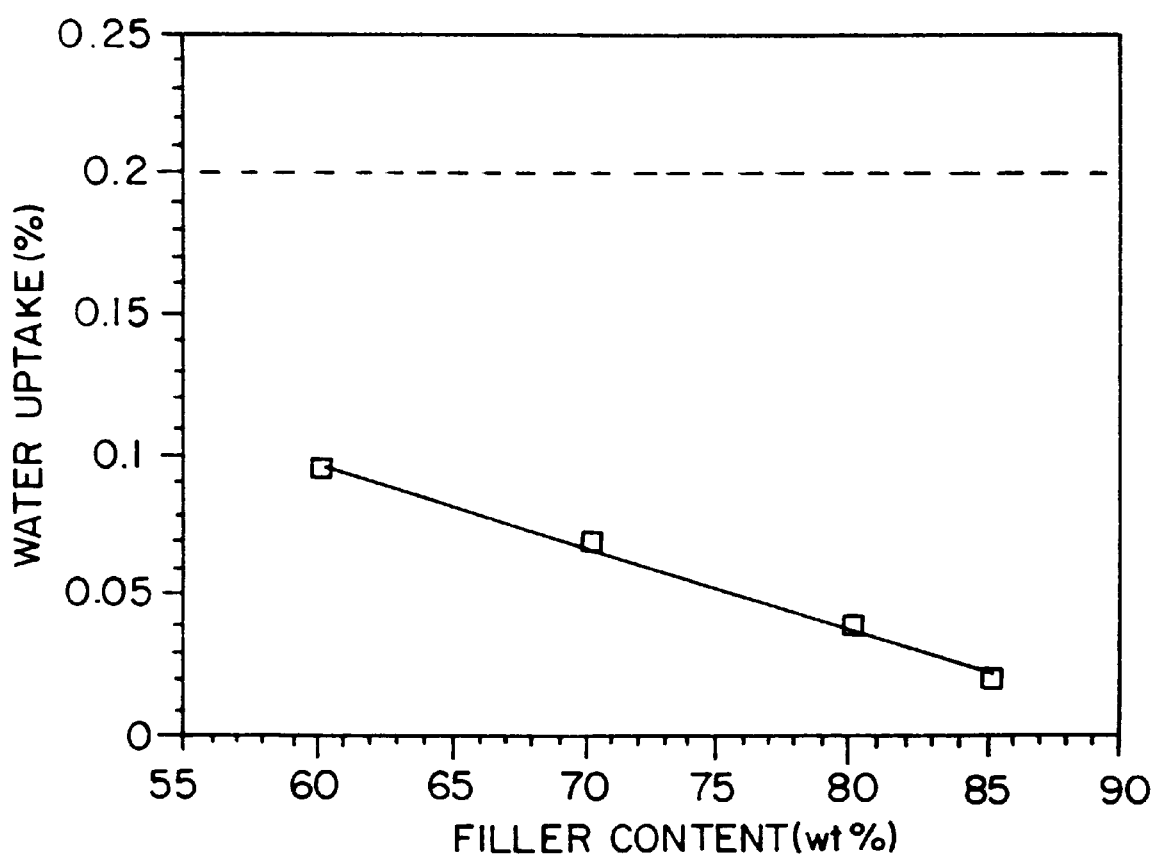
FIG. 3 is a graph showing the water absorption of the polybenzoxazine composite of the present invention at different filler contents from 60 wt. % to 85 wt. %.

FIG. 3 shows another advantage of the present invention in that the water absorption of the composite at room temperature at 24 hours is very low and as the filler content increases the water uptake decreases. The water uptake at 24 hours is less than 0.1% and is only about 0.02% at a filler content of 85% by weight. This water uptake is substantially less than the current standard of 0.2% for typical composites used in electronic packaging.

The method of the present invention is carried out by combining one or more type of benzoxazine monomers with particles of boron nitride tailored to form a polybenzoxazine composite upon curing having a thermal conductivity preferably above about 3 W/mK to a level as high as 37 W/mK.

As explained earlier coreactants, additives or mixtures may be included to control the mechanical characterization inclusive of mechanical strength for the composite and its viscosity. The benzoxazine resin may be synthesized in a conventional manner such as by dissolving the phenolic derivative and primary amine in a suitable solvent or by using the solventless synthesis preparation for benzoxazine compounds as taught in applicants copending application U.S. Ser. No. 08/245,478 now U.S. Pat. No. 5,543,516 dated Aug. 6, 1996 the disclosure of which is herein incorporated by reference.

What we claim is:

1. A composition for use in forming a high thermal conductivity polybenzoxazine-based material comprising at least one benzoxazine resin and a filler material including particles of boron nitride.

2. A composition as defined in claim 1 wherein the amount of said filler material in said composition is at least equal to about 60 wt. %.

3. A composition as defined in claim 2 wherein said boron nitride is in an amount sufficient to establish a thermal conductivity for said polybenzoxazine-based material between about 3 W/mK and 37 W/mK.

4. A composition as defined in claim 3 wherein said boron nitride is in a size range extending from 10 to 700 microns.

5. A composition as defined in claim 4 wherein said filler material further comprises particles selected from the group consisting of aluminum oxide, aluminum nitride and silica.

6. A composition as defined in claim 4 wherein said benzoxazine resin is formed from benzoxazine and epoxy compounds, benzoxazine and phenolic resin(s), benzoxazine and amine(s) and mixed benzoxazines.

7. A composition as defined in claim 5 further comprising conventional additives selected from the group consisting of lubricants, coupling agents, surfactants and non-polymerizable diluents.

8. A composition as defined in claim 4 wherein said benzoxazine resin is selected from the following formulae:

Class 1

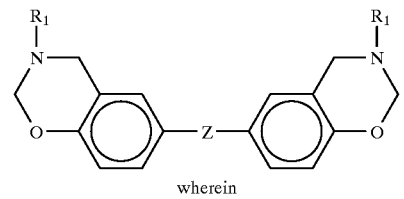

wherein

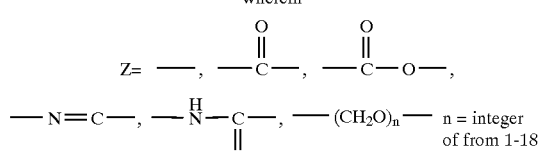

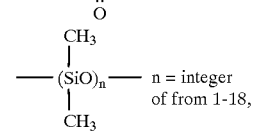

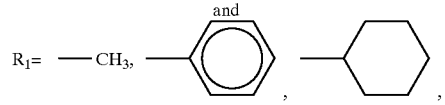

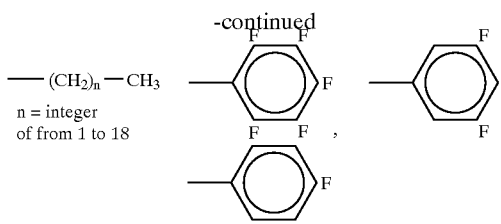

or an amino group;

Class 2

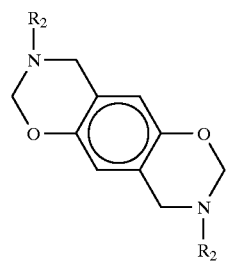

wherein

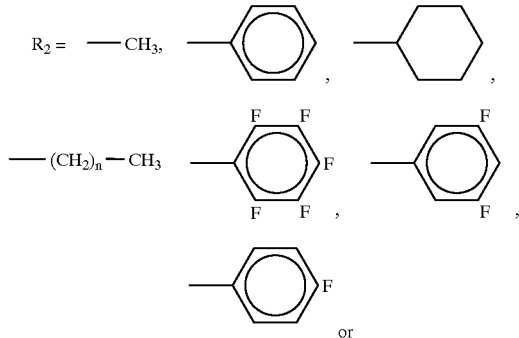

an amine, wherein n is an integer of FIGS. 1 to 18;

Class 3

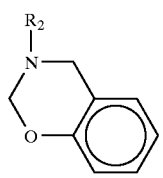

wherein $R_2$ is as defined above, and the benzene rings are unsubstituted or are substituted by one or more groups selected from —$CH_3$ and —Br;

Class 4

Multifunctional benzoxazine monomers of the formulas

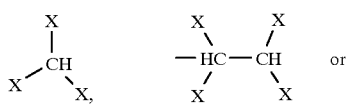

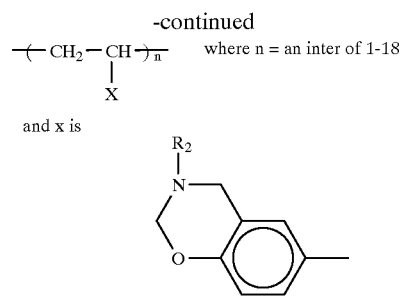

Class 5

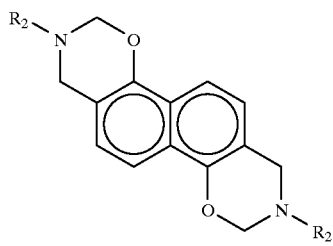

wherein $R_2$ is as defined for class 2.

9. A composition as defined in claim 5 consisting essentially of at least one benzoxazine resin and particles of boron nitride.

10. A composition as defined in claim 5 wherein boron nitride is filled to at least 68 volume % to yield a polybenzoxazine-based material having a thermal conductivity of above about 20 W/mK.

11. A composition as defined in claim 5 wherein boron nitride is filled to at least 72 volume % to yield a polybenzoxazine-based material having a thermal conductivity of above about 25 W/mK.

12. A method for forming a high thermal conductivity polybenzoxazine-based material comprising the steps of combining a filler material which includes particles of boron nitride with at least one benzoxazine resin to form a composition in which the filler material is loaded at a minimum concentration level of at least about 60 wt. % and curing the composition.

13. A method as defined in claim 12 wherein the curing takes place under elevated pressure.

14. A method as defined in claim 13 wherein said benzoxazine resin is synthesized without a solvent.

15. A high thermal conductivity polybenzoxazine-based material comprising particles of boron nitride in an amount sufficient to establish a thermal conductivity of between about 3 W/mK and 37 W/mK formed by combining a filler material which includes said particles of boron nitride with at least one benzoxazine resin.

16. A high thermal conductivity polybenzoxazine-based material according to claim 1 which is cured by molding said composition under elevated pressure.

* * * * *